United States Patent
Sato

(10) Patent No.: US 8,306,609 B2
(45) Date of Patent: Nov. 6, 2012

(54) VEIN IMAGING APPARATUS AND THUMBNAIL IMAGE CREATION METHOD

(75) Inventor: Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 404 days.

(21) Appl. No.: 12/569,577

(22) Filed: Sep. 29, 2009

(65) Prior Publication Data

US 2010/0080544 A1    Apr. 1, 2010

(30) Foreign Application Priority Data

Sep. 30, 2008    (JP) ................................ P2008-253970

(51) Int. Cl.
*A61B 5/00*    (2006.01)
(52) U.S. Cl. ............................ 600/473; 382/115; 396/14
(58) Field of Classification Search .................. 600/473; 382/115, 124; 348/340; 359/619; 396/14, 396/15
See application file for complete search history.

(56) References Cited

U.S. PATENT DOCUMENTS

| 7,274,808 B2 * | 9/2007 | Baharav et al. | 382/124 |
| 7,728,902 B2 * | 6/2010 | Kishigami et al. | 348/340 |

FOREIGN PATENT DOCUMENTS

| JP | 2003-150962 | 5/2003 |
| JP | 2008-36058 | 2/2008 |
| JP | 2008-217358 | 9/2008 |

* cited by examiner

*Primary Examiner* — Ruth S Smith
(74) *Attorney, Agent, or Firm* — Finnegan, Henderson, Farabow, Garrett & Dunner, L.L.P.

(57) ABSTRACT

A vein imaging apparatus includes a lens array including a plurality of photo-receiving lenses arranged in an array, a plurality of near-infrared illumination sources placed along opposed ends of the lens array to illuminate a part of a living body with near-infrared light, an image pickup device to create a picked-up image of a vein based on the near-infrared light scattered inside the living body, transmitted through the vein and gathered by the lens array, where a plurality of photoreceptors are allocated to one photo-receiving lens, and a thumbnail image creation unit to acquire information about the near-infrared light received by one photoreceptor among the plurality of photoreceptors allocated to one photo-receiving lens as pixel information corresponding to one photo-receiving lens, acquire the pixel information for all the photo-receiving lenses included in the lens array and create a thumbnail image based on the acquired pixel information.

6 Claims, 9 Drawing Sheets

VEIN IMAGING APPARATUS AND THUMBNAIL IMAGE CREATION METHOD

BACKGROUND OF THE INVENTION

1. Field of the Invention

The present invention relates to a vein imaging apparatus and a thumbnail image creation method.

2. Description of the Related Art

Biometric personal authentication is critically important technology for safeguarding the rights in the future network society. Particularly, in Internet commercial transactions where theft of money, contents, rights or the like via Internet is possible by means of spoofing by a third party, the biometric personal authentication attracts attention as technology for safeguarding the area that is insoluble with cryptograph only. Fingerprint or iris authentication, however, has the issue of forgery remaining unsolved. On the other hand, personal authentication technology that uses a vein pattern in a part which is difficult to be imaged from the outside is expected to be next-generation biometric personal authentication for its high verification accuracy and high difficulty of forgery or spoofing.

Examples of such biometric personal authentication technology are fingerprint authentication technology and vein authentication technology. While the fingerprint authentication technology has a problem in the existence of unregisterable users (about 4%), resistance to spoofing attacks using a residual fingerprint or the like, it has an advantage of reducing a sensor size because it allows easy image composition with a scan type using a line sensor, an area sensor or the like. On the other hand, the vein authentication technology, which is expected to be next-generation authentication technology having less problem, has been difficult to be mounted on mobile equipment or the like due to a large sensor, and, particularly, it has been difficult to form a device in a planar structure in an imaging scheme that uses a vein transmitted image due to a strict restriction on the position of a light source.

In order to achieve size reduction of a device using the vein authentication technology, Japanese Unexamined Patent Publication No. 2008-36058 discloses a technique of using a microlens array in which microlenses are arranged in an array.

SUMMARY OF THE INVENTION

In the case of employing a structure in which a plurality of pixels are placed in each lens of a microlens array, an image of each lens is such that the up and down and the left and right are respectively reversed. Further, upon authentication of a vein image, it is necessary to reverse and recombine the images of the respective lenses, and further high-speed operation is necessary for boundary processing in coupling between the lenses. It is thereby possible to address such an issue for speeding up preprocessing of authentication as in related art.

Furthermore, high speed is necessary when having a double function as an optical touchpad or the like, which is expected as an application, and it has been difficult to ensure a high accuracy of biometric authentication at the same time.

In light of the foregoing, it is desirable to provide a novel and improved vein imaging apparatus and thumbnail image creation method that enable speed-up of processing by creating a thumbnail image having a lower resolution than an actually captured image at a high speed.

According to an embodiment of the present invention, there is provided a vein imaging apparatus that includes a lens array including a plurality of photo-receiving lenses arranged in an array, a plurality of near-infrared illumination sources placed along opposed ends of the lens array to illuminate a part of a living body with near-infrared light, an image pickup device to create a picked-up image of a vein based on the near-infrared light scattered inside the living body, transmitted through the vein and gathered by the lens array, the image pickup device including a plurality of photoreceptors allocated to one photo-receiving lens, and a thumbnail image creation unit to acquire information about the near-infrared light received by one photoreceptor among the plurality of photoreceptors allocated to one photo-receiving lens as pixel information corresponding to one photo-receiving lens, acquire the pixel information for all the photo-receiving lenses included in the lens array and create a thumbnail image based on the acquired pixel information.

In this configuration, the plurality of photo-receiving lenses are arranged in an array in the lens array, and the plurality of near-infrared illumination sources that illuminate a part of a living body with near-infrared light are placed along the opposed ends of the lens array. The image pickup device creates a picked-up image of a vein based on the near-infrared light that has been scattered inside the living body, transmitted through the vein and gathered by the lens array, and a plurality of photoreceptors are allocated to one photo-receiving lens. The thumbnail image creation unit acquires information about the near-infrared light received by one photoreceptor among the plurality of photoreceptors that are allocated to one photo-receiving lens as pixel information corresponding to one photo-receiving lens, then acquires the pixel information for all the photo-receiving lenses included in the lens array, and further creates a thumbnail image based on the acquired pixel information.

It is preferred that the thumbnail image creation unit selects the pixel information of the photoreceptors in phase with one another with respect to each photo-receiving lens when acquiring the pixel information for all the photo-receiving lenses.

It is further preferred that the thumbnail image creation unit creates the thumbnail image by combining the selected pixel information of the photoreceptors in phase with one another without performing reversal processing.

The vein imaging apparatus may further include an image pickup device control unit to perform drive control of the image pickup device, and the image pickup device control unit may perform drive control along a given direction of the image pickup device by dividing the photoreceptors in several units along the given direction of the image pickup device.

The image pickup device control unit may output the pixel information of the plurality of photoreceptors along another direction orthogonal to the given direction as an average value.

The vein imaging apparatus may further include a parallax information acquisition unit to acquire information about parallax when imaging a part of the living body based on a plurality of thumbnail images, and the thumbnail image creation unit may acquire a plurality of kinds of information about the near-infrared light received by the photoreceptors in phase with one another with respect to each photo-receiving lens when acquiring the pixel information for all the photo-receiving lenses and create a plurality of kinds of thumbnail images.

According to another embodiment of the present invention, there is provided a thumbnail image creation method that includes illuminating a part of a living body with near-infrared light, gathering the near-infrared light scattered inside the living body and transmitted through a vein by a lens array including a plurality of photo-receiving lenses arranged in an array, imaging the near-infrared light scattered inside the living body, transmitted through the vein and gathered by the lens array with use of an image pickup device including a plurality of photoreceptors allocated to one photo-receiving lens, and acquiring information about the near-infrared light received by one photoreceptor among the plurality of photoreceptors allocated to one photo-receiving lens as pixel information corresponding to one photo-receiving lens, acquiring the pixel information for all the photo-receiving lenses included in the lens array and creating a thumbnail image based on the acquired pixel information.

According to the embodiments of the present invention described above, it is possible to enable speed-up of processing by creating a thumbnail image having a lower resolution than an actually captured image at a high speed.

DETAILED DESCRIPTION OF THE INVENTION

Figure 1:
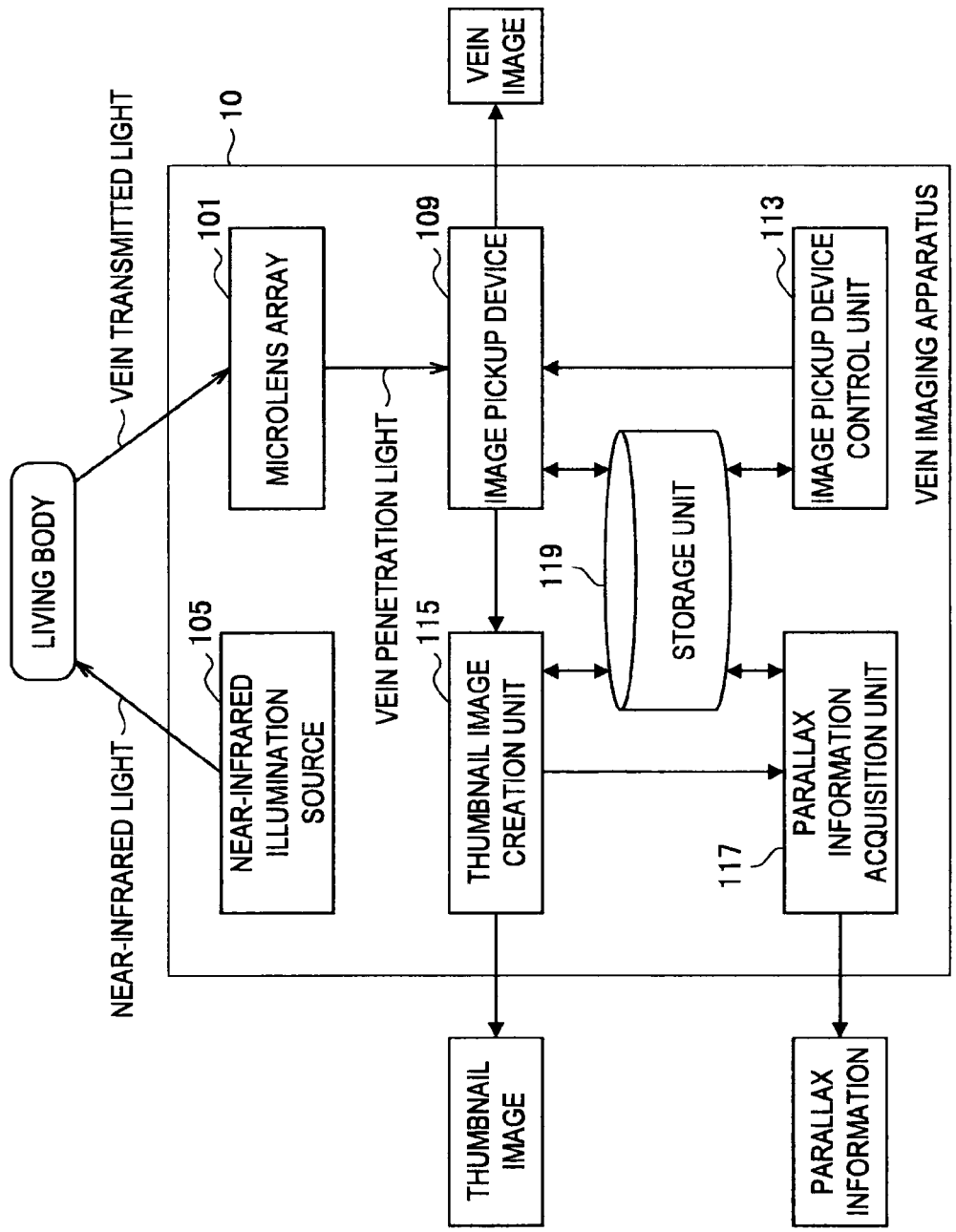
FIG. 1 is a block diagram showing a configuration of a vein imaging apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
(1) First embodiment
(1-1) Configuration of a vein imaging apparatus
(1-2) Thumbnail image creation method
(2) Hardware configuration of a vein imaging apparatus according to an embodiment of the present invention.
(3) Summary The inventor of the present invention has conducted studies in order to overcome the above-described issue and reached the following findings. In a vein imaging apparatus according to related art, it has been difficult to pick up an image of fine veins such as finger veins unless an imaging apparatus and an illumination apparatus are placed apart at a certain distance. This is because near-infrared light entering a finger is largely scattered by a living body. It is generally considered that 70% or higher percentage of near-infrared light entering a living body reaches only a dermis layer, and therefore light emitted from an imaging apparatus becomes reflected light to the dermis layer, and the contrast of a fine vein image that is a shadow by absorption of scattered light from the backside decreases significantly by the interference of the reflected light, which makes imaging difficult. Due to such a reason, a vein imaging apparatus according to related art can be used only for thick blood vessels of the palm, the back of hands and so on.

A vein imaging apparatus according to an embodiment of the present invention is an imaging apparatus composed of a flat sensor using a microlens array and an integral-type illumination apparatus placed on the periphery of a panel. In an embodiment of the present invention, a directivity control plate or an aperture that is disposed to selectively extract light is placed in each of a microlens array and a light source, thereby enabling selective imaging of light from the backside of veins. Integration of a light source and a sensor, which has been considered to be impossible in a hitherto known optical system, is thereby achieved.

On the other hand, there is an advantage that it is necessary to perform image composition processing, which has been not necessary in a device with a camera hitherto used. This increases computational load of image processing in performance such as template search or positional registration when authenticating a captured vein image.

In a vein imaging apparatus according to related art, a captured vein image is output as a signal. However, in a microlens array, an image in which the up and down and the left and right are reversed is output as a picked-up image of each lens. It is thus necessary to perform correction processing such as (1) reversal processing of reversing a picked-up image of each lens and (2) boundary processing when combining picked-up images after reversal. In the case of performing such correction processing by software, the performance decreases compared to related art.

Further, in vein authentication processing that uses a captured vein image, it is necessary to perform finger position specifying, thumbnail search, positional registration and so on by using a thumbnail image in which a resolution is reduced from a registered image in order to speed up the processing.

In order to address such issues, the inventor of the present invention has reached the finding that it is important to speed up the processing when capturing a vein image with use of a microlens array. Thus, the inventor of the present invention has conducted intensive studies in order to overcome the above-described issues and invented a vein imaging apparatus according to an embodiment of the present invention as described below.

(First Embodiment)
<Configuration of a Vein Imaging Apparatus>

Figure 2:
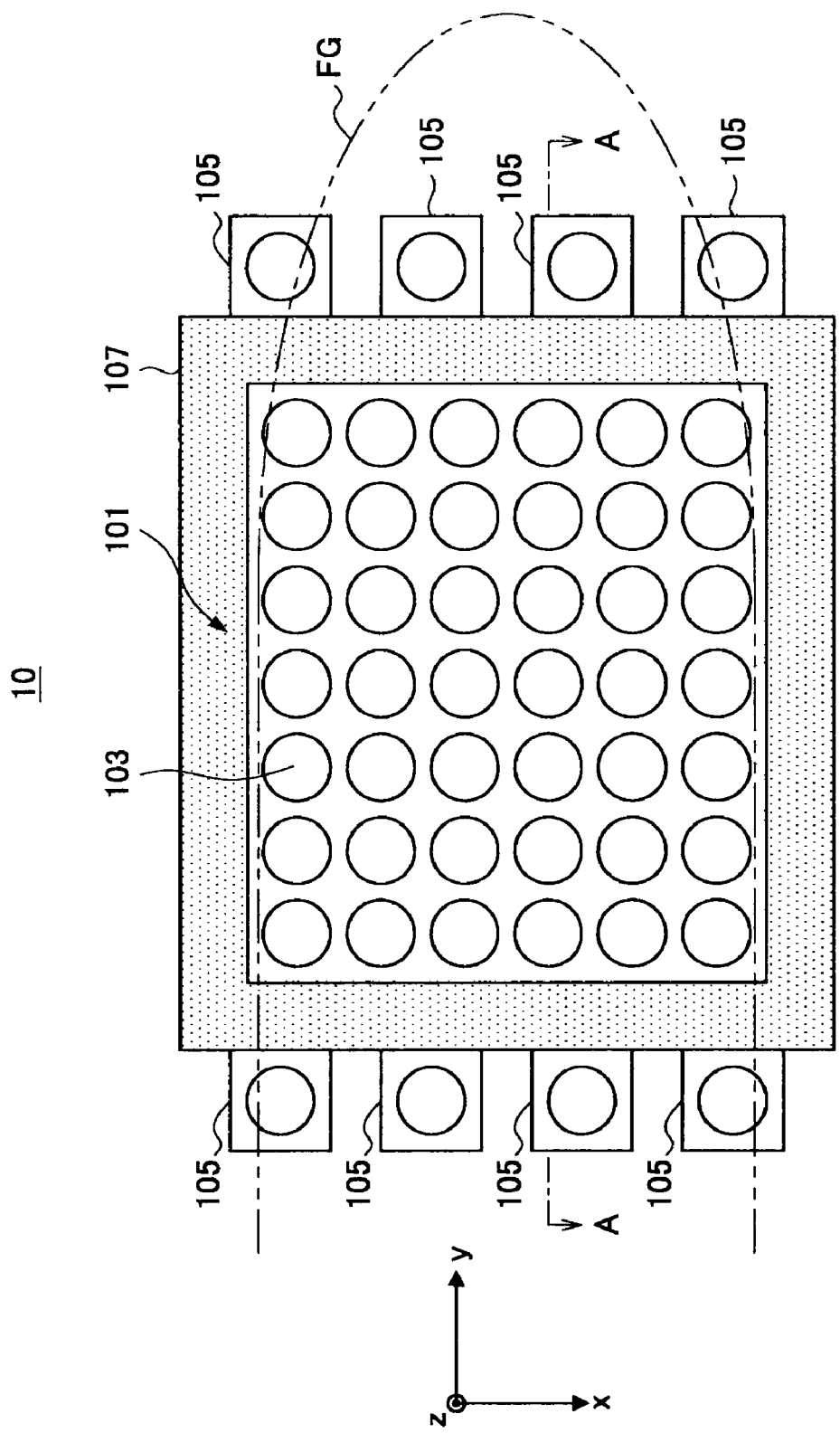
FIG. 2 is a plan view of the vein imaging apparatus according to the embodiment.
Figure 3:
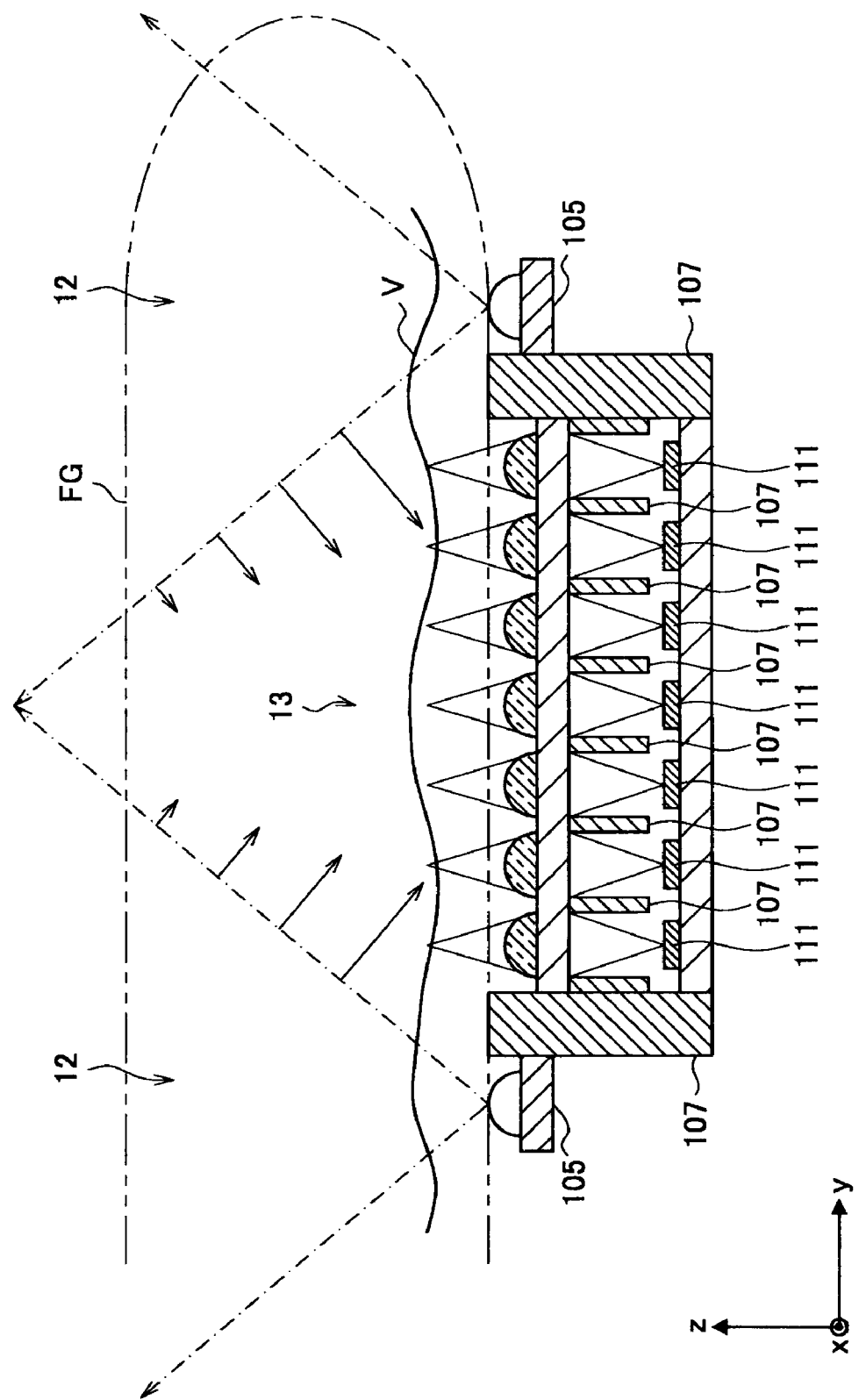
FIG. 3 is a sectional view along line A-A in FIG. 2.

A configuration of a vein imaging apparatus according to a first embodiment of the present invention is described hereinafter in detail with reference to FIGS. 1 to 3. FIG. 1 is a block diagram showing a configuration of a vein imaging apparatus according to the embodiment. FIG. 2 is a plan view of the vein imaging apparatus according to the embodiment. FIG. 3 is a sectional view along line A-A in FIG. 2.

A vein imaging apparatus 10 according to the embodiment mainly includes a microlens array 101, a near-infrared illumination source 105, an image pickup device 109, an image pickup device control unit 113, a thumbnail image creation unit 115, a parallax information acquisition unit 117 and a storage unit 119 as shown in FIG. 1, for example. The vein imaging apparatus 10 picks up an image of a part of a living body (e.g. a finger) that is placed on the apparatus and creates a picked-up image of a vein existing inside the living body (i.e. a vein image) and further creates a thumbnail image having a lower resolution than the created vein image. Further, the vein imaging apparatus 10 according to the embodiment can acquire information about parallax (parallax information) based on the created thumbnail image.

The microlens array (MLA) 101 gathers near-infrared light that is emitted from the near-infrared illumination source 105, which is described later, to a part of a living body and transmitted through a vein inside the living body (which is also referred to hereinafter as vein transmitted light) onto the image pickup device 109, which is described later. The microlens array 101 is composed of a plurality of photo-receiving lenses as described later.

The near-infrared illumination source 105 illuminates a part of a living body placed on the vein imaging apparatus 10 with near-infrared light in a prescribed wavelength band. Because the near-infrared light has characteristics that it is well transmitted through body tissues and absorbed by hemoglobin (reduced hemoglobin) in blood, if the near-infrared light is illuminated on the finger, palm or back of a hand, veins distributed inside the finger, palm or back of the hand appear as a shadow in an image. The shadow of veins that appears in an image is called a vein pattern. In order to suitably pick up an image of the vein pattern, the near-infrared illumination source 105 emits near-infrared light having a wavelength of about 600 nm to 1300 nm or, preferably, about 700 nm to 900 nm.

If the wavelength of the near-infrared light emitted from the near-infrared illumination source 105 is less than 600 nm or more than 1300 nm, the percentage of light that is absorbed by hemoglobin in blood decreases, and it becomes difficult to obtain a suitable vein pattern. On the other hand, if the wavelength of the near-infrared light emitted from the near-infrared illumination source 105 is about 700 nm to 900 nm, the near-infrared light is specifically absorbed by both deoxygenated hemoglobin and oxygenated hemoglobin, and it is therefore possible to obtain a suitable vein pattern.

As the near-infrared illumination source 105, a light emitting diode (LED) may be used, for example. Further, in stead of using a light emitting diode in the above wavelength band, a combination of a light emitting diode capable of emitting light containing the above wavelength band and a filter for optically limiting the band of emitted light may be used.

The image pickup device 109 has an image pickup surface on which a plurality of photoreceptors 111 are arranged in a lattice structure, and creates a vein image by near-infrared light based on the vein transmitted light that is focused by the microlens array 101. As the image pickup device 109 according to the embodiment, a charge coupled device (CCD) image sensor, a complementary metal-oxide semiconductor (CMOS) image sensor or the like may be used. The image pickup device 109 outputs the created vein image (which is also referred to hereinafter as imaging data). Further, the image pickup device 109 may store the created vein image into the storage unit 119, which is described later.

In the vein imaging apparatus 10 according to the embodiment, a plurality of photoreceptors 111 are allocated to one photo-receiving lens of the microlens array 101 as described later. Thus, in the vein imaging apparatus 10 according to the embodiment, the near-infrared light (vein transmitted light) that is gathered by one photo-receiving lens is imaged by a plurality of photoreceptors 111.

The timing of scanning photoreceptors or the like in the image pickup device 109 is controlled by the image pickup device control unit 113, which is described later.

The image pickup device control unit 113 is composed of a central processing unit (CPU), read only memory (ROM), random access memory (RAM) or the like, for example, and controls driving of the image pickup device 109. Specifically, the image pickup device control unit 113 controls the scan timing of the photoreceptors 111 forming the image pickup device 109, the selection of the photoreceptor 111 from which information is to be acquired and so on based on a prescribed synchronizing signal or the like.

Specifically, the image pickup device control unit 113 performs drive control along one given direction of the image pickup device 109 by dividing the photoreceptors in several units along one given direction of the image pickup device 109. Specifically, when considering a cross section along a certain direction of the image pickup device 109 according to the embodiment, it is assumed that seven photoreceptors, for example, exist in the image pickup device 109. In such a case, the image pickup device control unit 113 performs drive control by dividing the photoreceptors into seven groups along the direction of the sectional line.

Further, the image pickup device control unit 113 may output pixel information of a plurality of photoreceptors along another direction orthogonal to the above-described given direction as an average value.

When performing control of the image pickup device 109, the image pickup device control unit 113 may refer to various kinds of parameters, databases or the like that are stored in the storage unit 119, which is described later.

The drive control of the image pickup device 109 which is performed by the image pickup device control unit 113 is described in detail later.

The thumbnail image creation unit 115 is composed of a CPU, ROM, RAM or the like, for example. The thumbnail image creation unit 115 acquires information about vein transmitted light that is received by one photoreceptor among a plurality of photoreceptors that are allocated to one photo-receiving lens as pixel information corresponding to one photo-receiving lens, and then acquires pixel information for all photo-receiving lenses in the microlens array. Further, the thumbnail image creation unit 115 creates a thumbnail image based on the acquired pixel information.

When creating a thumbnail image, the thumbnail image creation unit 115 can use various kinds of parameters, databases, programs or the like that are stored in the storage unit 119, which is described later.

A method of creating a thumbnail image is described in detail later.

The thumbnail image creation unit 115 can output the created thumbnail image to the outside of the vein imaging apparatus 10. Further, the thumbnail image creation unit 115 outputs the created thumbnail image to the parallax information acquisition unit 117, which is described later. Furthermore, the thumbnail image creation unit 115 may store the created thumbnail image in association with information about the created date and time or the like into the storage unit 119, which is described later.

The parallax information acquisition unit 117 is composed of a CPU, ROM, RAM or the like, for example, and acquires information about parallax when picking up an image of a part of a living body as parallax information based on the thumbnail image that is created by the thumbnail image creation unit 115. In the vein imaging apparatus 10 according to the embodiment, a plurality of photoreceptors 111 are associated with one photo-receiving lens as described later. Therefore, even if images are obtained from light gathered by the same photo-receiving lens, parallax occurs in the obtained images depending on the position of the photoreceptor 111. The parallax information acquisition unit 117 according to the embodiment analyzes a plurality of thumbnail images to acquire the information about parallax and thereby calculates a distance from an object (i.e. a part of a living body). Because the parallax information appears as a displacement of a focal position on the image, it is possible to detect the outer shape of an imaging object by using the parallax information.

For example, the parallax information acquisition unit 117 may perform differentiation of the obtained thumbnail image to detect an edge and compare a distance of a part recognized as the edge, thereby determining whether it is the outer shape of an imaging object.

The parallax information acquisition unit 117 can output the acquired parallax information to the outside of the vein imaging apparatus 10. Further, the parallax information acquisition unit 117 may store the acquired parallax information in association with information about the acquired date and time or the like into the storage unit 119, which is described later.

The storage unit 119 can store various parameters or progress of processing that are necessary to be stored while the vein imaging apparatus 10 performs certain processing, various kinds of databases and so on according to need. In addition to those data, the storage unit 119 may store a vein image created by the image pickup device 109, a thumbnail image created by the thumbnail image creation unit 115, parallax information acquired by the parallax information acquisition unit 117 and so on. Data may be freely written to or read from the storage unit 119 by the image pickup device 109, the image pickup device control unit 113, the thumbnail image creation unit 115, the parallax information acquisition unit 117 and so on.

[Structure of a Vein Imaging Apparatus]

A structure of the vein imaging apparatus according to the embodiment is described hereinafter in detail with reference to FIGS. 2 and 3.

The microlens array 101 of the vein imaging apparatus 10 according to the embodiment is made up of a plurality of microlenses 103, which are photo-receiving lenses, and the microlenses 103 are arranged in a lattice structure on a given substrate as shown in FIG. 2, for example. Each microlens 103 guides vein transmitted light that enters the microlenses 103 through a plane of incidence to the image pickup device 109 (specifically, the photoreceptor 111 of the image pickup device 109), which is described later, as shown in FIG. 3, for example. The microlens array 101 is a lens array with a small curvature of field and with no distortion in the depth direction, and therefore suitable image data can be obtained by using the microlens array 101. The focal position of each microlens 103 forming the microlens array 101 is set to be the position of a vein layer where a vein V exists, which is an imaging target of the vein imaging apparatus 10.

Human skin is known to have a three-layer structure including an epidermis layer, a dermis layer and a subcutaneous tissue layer, and the above-described vein layer exists in the dermis layer. The dermis layer is located at about 0.1 mm to 0.3 mm below the finger surface and has a thickness of about 2 mm to 3 mm. Thus, by setting the focal position of the microlens 103 at the existing position of the dermis layer (e.g. the position that is about 1.5 mm to 2.0 mm below the finger surface), it is possible to efficiently gather the light transmitted through the vein layer.

The number of the microlenses 103 in the microlens array 101 according to the embodiment is not limited to the example shown in FIG. 2. The number of the microlenses 103 in the microlens array 101 according to the embodiment may be set arbitrarily according to the size of a living body to be imaged, the size of the image pickup device 109 or the like.

A plurality of light emitting diodes, which are an example of the near-infrared illumination source 105, are placed at the opposed ends of the microlens array 101 as shown in FIG. 2, for example. The ends where the light emitting diodes are placed are preferably the ends corresponding to the upper end and the lower end of a part of a living body (which is a finger FG in the example shown in FIGS. 2 and 3). By placing the light emitting diodes in this manner, it is possible to apply the near-infrared light from the top and the bottom of the finger FG.

The number of the near-infrared illumination sources 105 according to the embodiment is not limited to the example shown in FIG. 2, and it may be set arbitrarily according to the size of the microlens array 101, an illumination area of the near-infrared illumination sources 105 or the like.

Further, a directivity control plate 107 is placed between the microlens array 101 and the near-infrared illumination source 105 as shown in FIGS. 2 and 3, for example. The directivity control plate 107 controls the directivity of direct light 12 that is emitted from the near-infrared illumination sources 105 in such a way that the direct light 12 does not directly enter the microlenses 103 of the microlens array 101.

The near-infrared light that is emitted from the near-infrared illumination sources 105 propagates upward to the surface of the finger FG and enters the finger FG as the direct light 12 as shown in FIG. 3, for example. Because a human body is a suitable scatterer of near-infrared light, the direct light 12 that has entered the finger FG is scattered in all directions while propagating. A part of such scattered light travels as rear scattered light 13 through the above-described vein layer from the backside to the finger surface, and passes through the vein V on its way. The vein transmitted light that has passed through the vein enters the respective microlenses 103 forming the microlens array 101.

The directivity control plate 107 is placed at the boundary between the adjacent microlenses 103. The directivity control plate 107 enables control of the directivity of the vein transmitted light, thereby allowing selection of the vein transmitted light to be focused on the image pickup device 109 (specifically, the photoreceptor 111).

Although only one photoreceptor 111 corresponds to one microlenses 103 in the illustration of FIG. 3, a plurality of photoreceptors 111 correspond to one microlenses 103 in practice, as described later.

[Image Obtained by a Microlens Array]

Figure 4A:
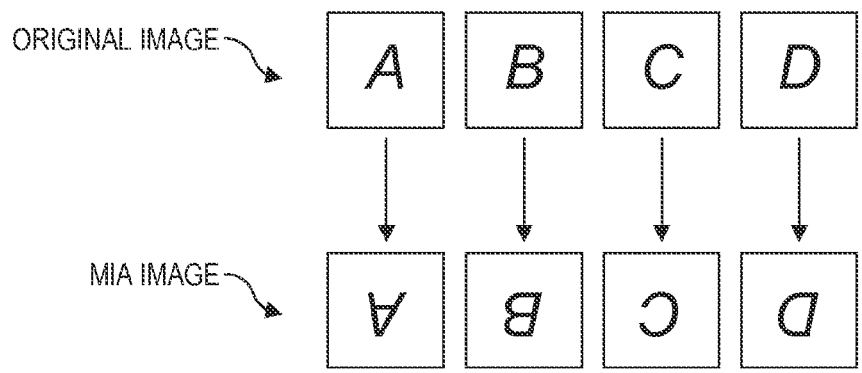
FIG. 4A is an explanatory view to describe an image captured by a microlens array.
Figure 4B:
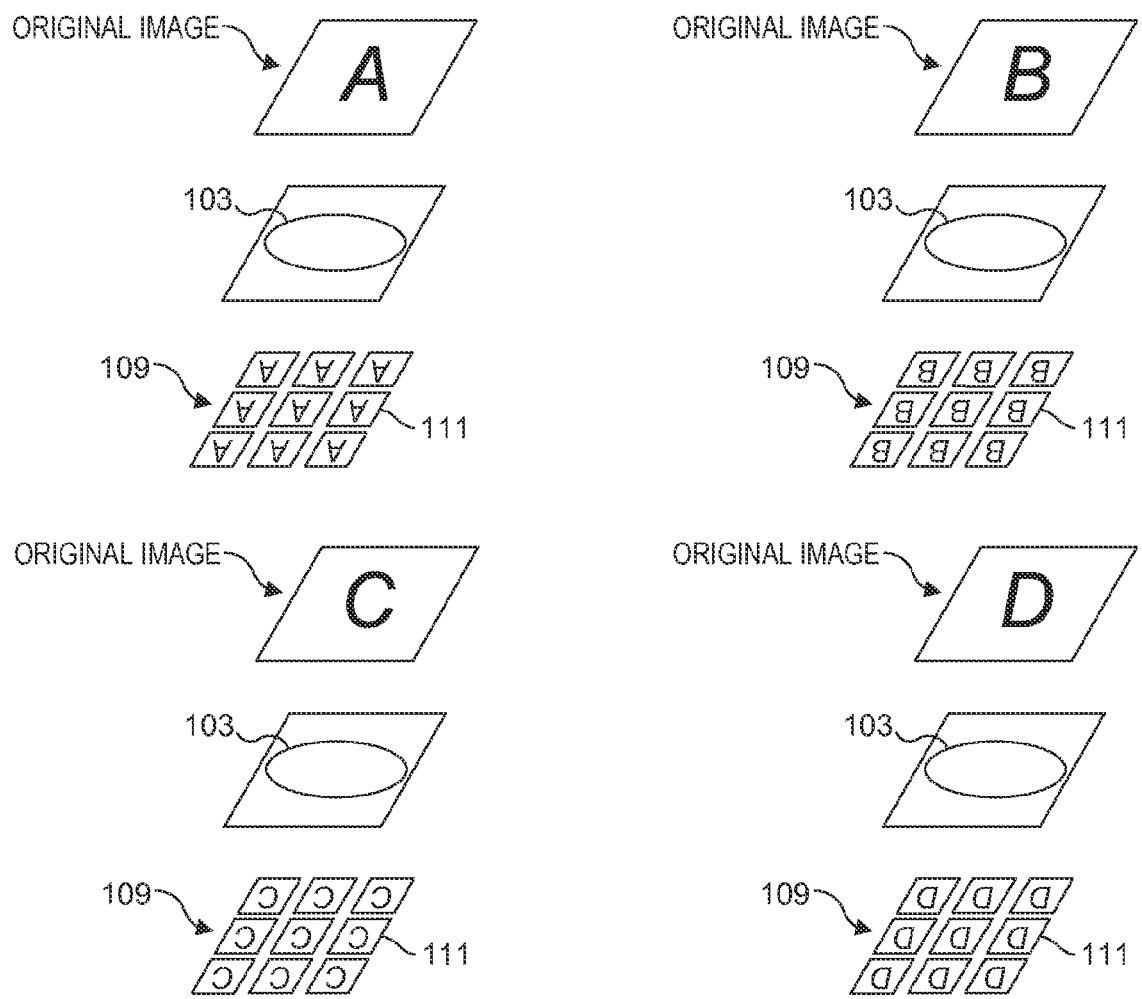
FIG. 4B is an explanatory view to describe an image captured by a microlens array.

Characteristics of an image obtained by a microlens array are described hereinafter in detail with reference to FIGS. 4A and 4B. FIGS. 4A and 4B are explanatory views to describe an image that is picked up by a microlens array.

Generally, if a certain image IS picked up by using a microlens array (MLA), a picked-up image is such that the up and down and the left and right are respectively reversed from an original image as shown in FIG. 4A, for example. Further, because a plurality of photoreceptors 111 are allocated to each photo-receiving lens (microlens 103) in practice, an image in which the up and down and the left and right are reversed is created for all the photoreceptors 111 allocated to each microlens 103. For example, if a plurality of, such as. for example, nine (3×3) photoreceptors 111 are allocated to each microlens 103 as shown in FIG. 4B, an image in which the up and down and the left and right are reversed is created for each of the nine photoreceptors 111.

Therefore, an imaging apparatus using a microlens array according to related art first performs reversal processing on all images that are obtained from the photoreceptors 111 allocated to one microlens 103 so as to change the up-and-down relationship and the left-and-right relationship back to the original state, and then combines the respective images to thereby increase the resolution of the image. Because image reversal processing and composition processing of images obtained by the respective photoreceptors are necessary in a hitherto known image processing method as described above, a method of creating a thumbnail image as used in the hitherto known image processing method or the like is not available, which makes it difficult to speed up the processing.

However, the vein imaging apparatus 10 according to the embodiment can easily create a thumbnail image by making an effective use of the characteristics of a microlens array as described below.

[Function of a Thumbnail Image Creation Unit]

Figure 5A:
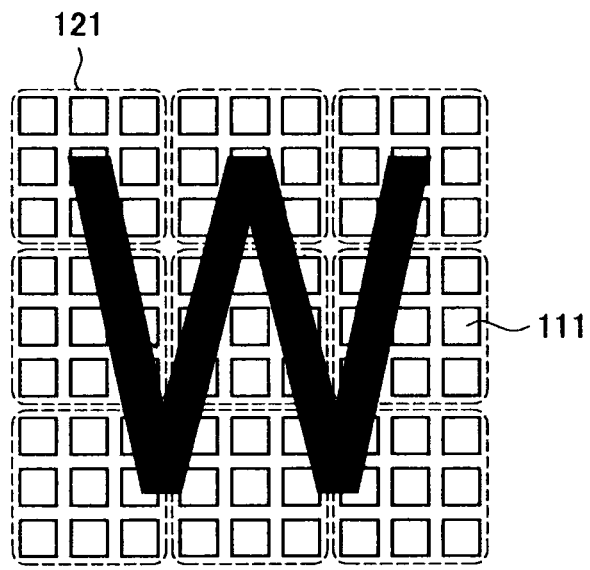
FIG. 5A is an explanatory view to describe a function of a thumbnail image creation unit according to the embodiment.
Figure 5B:
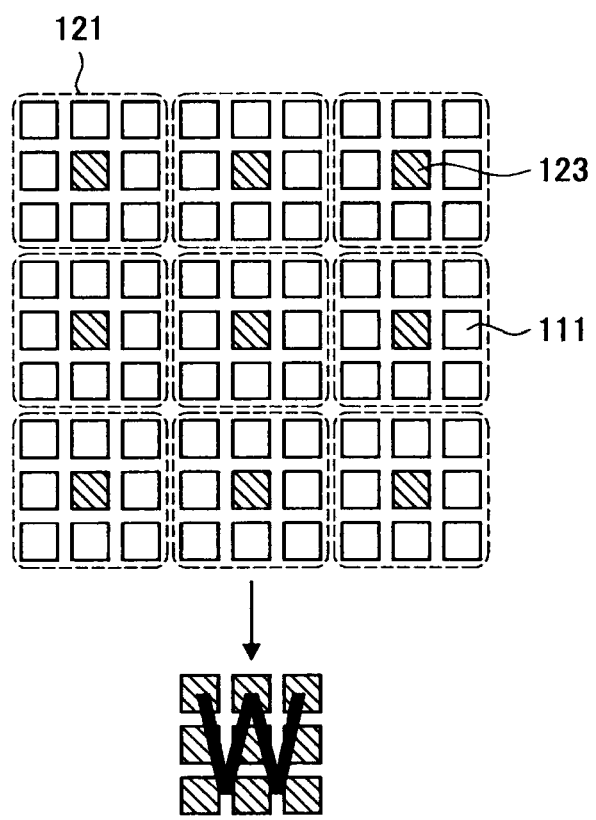
FIG. 5B is an explanatory view to describe a function of a thumbnail image creation unit according to the embodiment.

A method of creating a thumbnail image, which is the function of the thumbnail image creation unit 115, with use of the characteristics of a microlens array is described hereinafter in detail with reference to FIGS. 5A and 5B. FIGS. 5A and 5B are explanatory views to describe the function of the thumbnail image creation unit according to the embodiment.

Consider, for example, the case of imaging a letter "W" by using a microlens array that is made up of nine microlenses 103 as shown in FIG. 5A. In this example, nine photoreceptors 111 are associated with one microlens 103, and the nine photoreceptors 111 form a unit block 121 as shown in FIG. 5A.

If the letter "W" is imaged by the nine microlenses 103, a part of the letter "W" existing in each unit block 121 is imaged by the respective microlenses 103. As a result, a part of the letter "W" existing in each unit block 121 is imaged by each of the nine microlenses 103 in the state where the up and down and the left and right are reversed.

The thumbnail image creation unit 115 according to the embodiment creates a thumbnail image, utilizing that each image is in a forward sequence when focusing attention on one photoreceptor 111 among the nine photoreceptors corresponding to each microlens 103.

For example, imaging data obtained by photoreceptors 123 that are in phase with one another among the photoreceptors 111 constituting the unit block 121 corresponding to each microlens 103 is used as shown in FIG. 5B. The photoreceptors 123 are in phase with one another when their positions in the respective unit blocks 121 correspond. For example, in the example of FIG. 5B, the photoreceptors located at the center of the respective unit blocks 121 are the photoreceptors 123 in phase with one another.

The imaging data obtained from the photoreceptors 123 in phase with one another is such that the microlens 103 and the photoreceptor 123 are in one-to-one correspondence. Further, the imaging data obtained from the photoreceptors 123 has a low resolution because it is not composite data of the imaging data obtained from all the photoreceptors forming the unit block 121. Accordingly, a thumbnail image can be created as shown in FIG. 5B by simply combining the imaging data from the photoreceptors 123 acquired from the respective unit blocks 121.

In the thumbnail image creation method according to the embodiment, it is not necessary to perform processing of reversing and combining the imaging data obtained from the respective photoreceptors 111 forming the unit block 121 before creating a thumbnail image, unlike a hitherto known image processing method using a microlens array. This speeds up the processing of creating a thumbnail image. It is thereby possible to speed up the entire processing.

Further, by obtaining an independent thumbnail in the pixels at both ends and at the center of each unit block 121 by the above computation, the parallax information acquisition unit 117 according to the embodiment can extract the outer shape of a finger with use of parallax information obtained by the direct computation. The outer shape information can be used for positional registration, extraction of an effective region or the like, which is preprocessing in finger vein authentication. Further, the parallax information may be used also for finger position detection in an optical touchpad.

By combining the thumbnail image creation method according to the embodiment with an image pickup device drive control method as described below, it is possible to create thumbnail images continuously in real time.

[Function of an Image Pickup Device Control Unit]

Figure 6A:
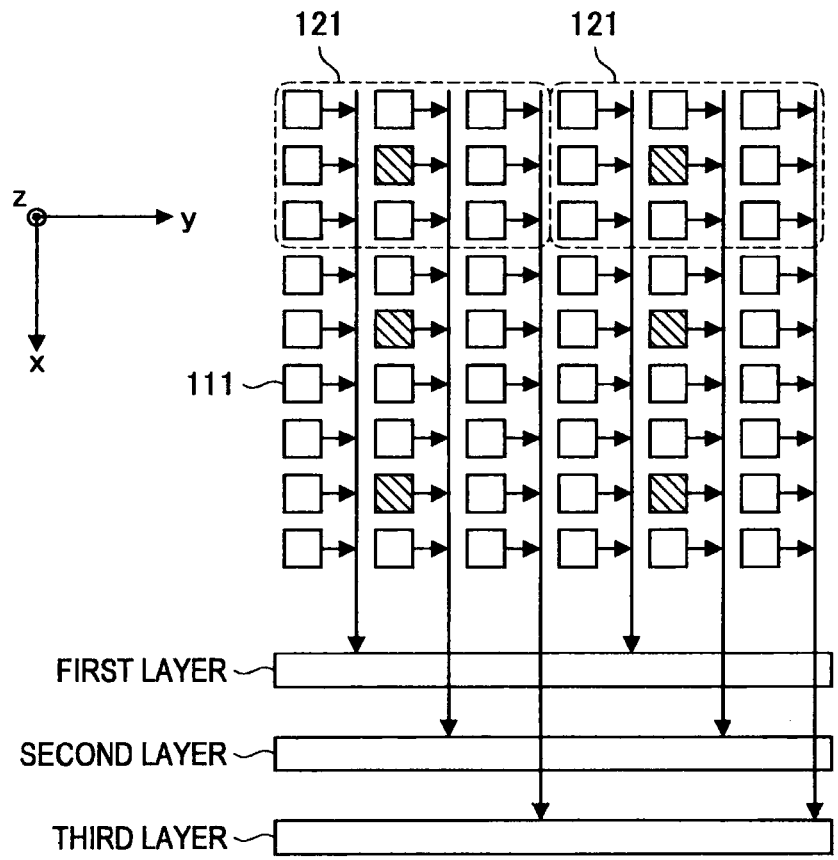
FIG. 6A is an explanatory view to describe a function of an image pickup device control unit according to the embodiment.
Figure 6B:
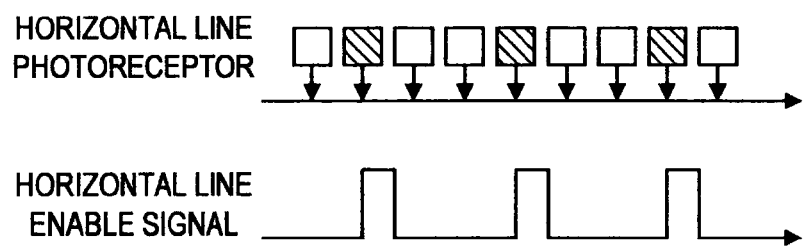
FIG. 6B is an explanatory view to describe a function of an image pickup device control unit according to the embodiment.
Figure 7:
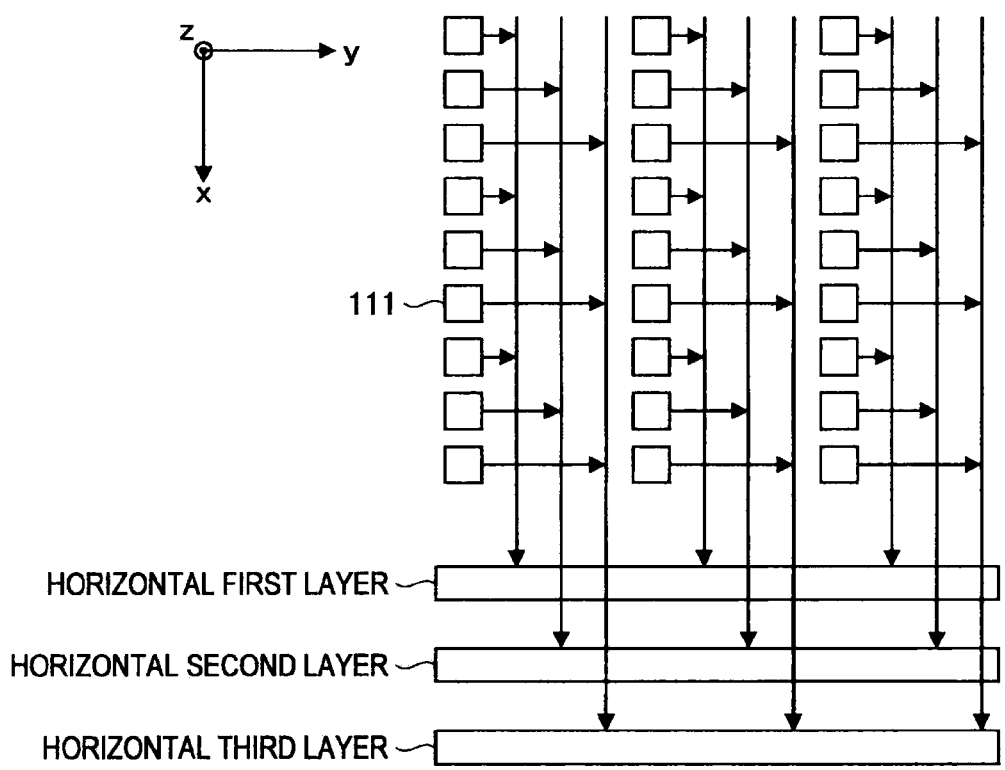
FIG. 7 is an explanatory view to describe a function of an image pickup device control unit according to the embodiment.

A method of controlling driving of the image pickup device 109 by the image pickup device control unit 113 is described hereinafter in detail with reference to FIGS. 6A to 7. FIGS. 6A and 6B are explanatory views to describe the function of the image pickup device control unit according to the embodiment. FIG. 7 is an explanatory view to describe the function of the image pickup device control unit according to the embodiment.

A CCD image pickup device or a CMOS image pickup device, which is used as the image pickup device 109 of the vein imaging apparatus 10 according to the embodiment, is a multilayer device. FIG. 6A shows a case where the image pickup device 109 is a multilayer device made up of three layers, for example.

In the vein imaging apparatus 10 according to the embodiment, the image pickup device 109 performs line scanning in the lengthwise direction of a finger, which is, the direction along the y-axis in FIG. 6A. The direction along the y-axis in FIG. 6A is referred to hereinafter as a vertical direction, and the direction orthogonal to the vertical direction, which is the direction along the x-axis in FIG. 6A, is referred to hereinafter as a horizontal direction.

As shown in FIG. 6A, in the vein imaging apparatus 10 according to the embodiment, the imaging data is output in the vertical synchronous time base in units of horizontal lines, controlled by the image pickup device control unit 113. Specifically, the photoreceptors arranged along a certain horizontal direction output data in synchronism to a first layer shown in FIG. 6A, the photoreceptors arranged along a certain horizontal direction output data in synchronism to a second layer, and the photoreceptors arranged along a certain horizontal direction output data in synchronism to a third layer. In this manner, according to the control by the image pickup device control unit 113, the image pickup device 109 can perform multilayered output by the horizontal lines that are in phase among the unit blocks 121 of the MLA.

Therefore, the image pickup device control unit 113 according to the embodiment selects the output from a certain layer of the multilayer device and further selects only the pixels (photoreceptors) that are in phase on the horizontal line by timing control. The image pickup device 109 according to the embodiment can thereby output the outputs from the photoreceptors 123 that are in phase with one another as shown in FIG. 5B to the thumbnail image creation unit 115.

For example, the photoreceptors 111 which are diagonally shaded in FIG. 6A are devices located at the center of the respective unit blocks 121, and the outputs from the devices are output to the second layer as shown in FIG. 6A. Further, the image pickup device control unit 113 performs timing control on the horizontal line along the x-axis by using a horizontal line enable signal as shown in FIG. 6B, thereby enabling transfer of the outputs from the photoreceptors 123 that are in phase with one another to the thumbnail image creation unit 115.

Further, by sequentially using the outputs obtained from the respective layer, rather than using the output from one layer only, it is possible to continuously obtain a plurality of thumbnail images at a high frame rate.

Although a method of performing division driving of a vertical synchronous line is described in the example shown in FIGS. 6A and 6B, circuitry division driving in a horizontal line may be performed as shown in FIG. 7.

In the example shown in FIG. 7, there are three kinds of the photoreceptors 111 existing on the same horizontal line: photoreceptors for outputting data to a horizontal first layer, photoreceptors for outputting data to a horizontal second layer and photoreceptors for outputting data to a horizontal third layer. Therefore, the image pickup device control unit 113 according to the embodiment can output the outputs from the photoreceptors that are in phase with one another to the thumbnail image creation unit 115 by selecting the output from a certain layer of the multilayer device.

The method shown in FIGS. 6A and 6B and the method shown in FIG. 7 may be used in combination.

As described above, by performing drive control of the image pickup device 109 by the image pickup device control unit 113, it is possible to directly obtain thumbnail images continuously in real time without carrying out sorting by signal processing.

Further, the drive control of the image pickup device according to the embodiment may be applied to a vein authentication apparatus. By combining the drive control and a series of image processing, it is possible to speed up a series of operations necessary for vein authentication processing, such as processing of retrieving one that is similar to an image to be authenticated from registered vein templates, processing of specifying or correcting a position and authentication processing itself.

Furthermore, because the creation of a thumbnail image can be also performed at a high frame rate by multiplexing control as described above, it is possible to speed up the preprocessing of authentication in vein authentication processing.

An example of the function of the vein imaging apparatus 10 according to the embodiment is described in the foregoing. Each of the above-described elements may be configured using a general-purpose member or circuit, or it may be configured by hardware specialized to the function of each element. Further, the function of each element may be entirely realized by a CPU or the like. It is thereby possible to change the configuration to use as appropriate according to the technique level when implementing the embodiment.

The vein imaging apparatus 10 according to the embodiment may be used also as an optical touchpad, touch pen or the like. In signal processing in a touchpad, a touch pen or the like, a multiplexed image can be handled as one pixel selected from a set of pixels forming the unit block 121. Therefore, the multiplexing enables the resolving power of a touchpad or a touch pen to be determined without conducting image composition processing, thereby reducing computational load.

<Thumbnail Image Creation Method>

Figure 8:
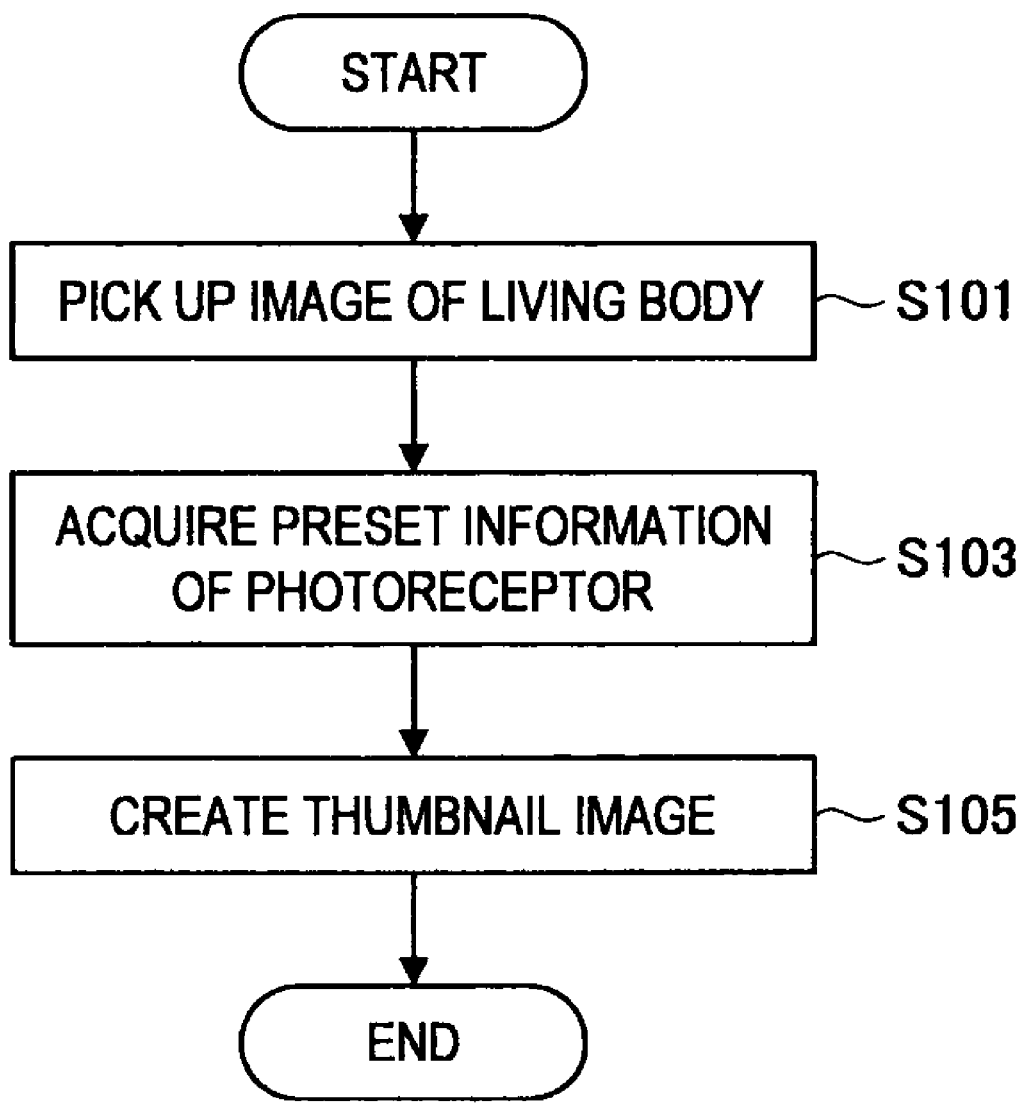
FIG. 8 is a flowchart to describe a thumbnail image creation method according to the embodiment.

A thumbnail image creation method according to the embodiment is described hereinafter in detail with reference to FIG. 8. FIG. 8 is a flowchart to describe a thumbnail image creation method according to the embodiment.

In the thumbnail image creation method according to the embodiment, the near-infrared illumination source 105 illuminates a part of a living body for which a thumbnail image of a vein is to be created with near-infrared light, and the microlens array 101 and the image pickup device 109 pick up an image of the living body (Step S101).

The driving of the image pickup device 109 is controlled by the image pickup device control unit 113, and the thumbnail image creation unit 115 can acquire preset information of photoreceptors (i.e. information about the photoreceptors 123 that are in phase with one another) (Step S103).

After that, the thumbnail image creation unit 115 can create a thumbnail image by using the acquired information of the photoreceptors 123 (Step S105).

<Hardware Configuration>

Figure 9:
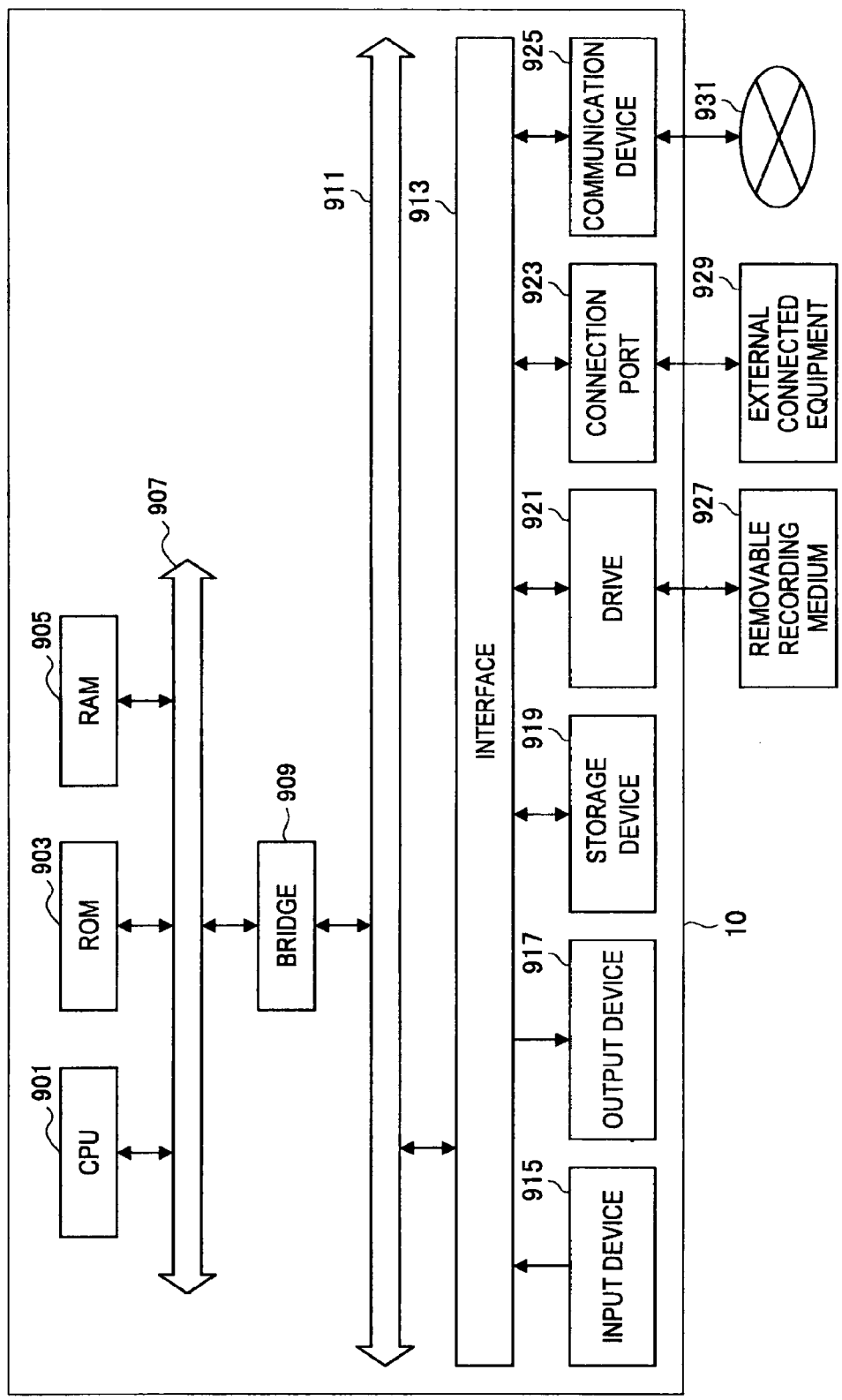
FIG. 9 is a block diagram to describe a hardware configuration of a vein imaging apparatus according to an embodiment of the present invention.

A hardware configuration of the vein imaging apparatus 10 according to an embodiment of the present invention is described hereinafter with reference to FIG. 9. FIG. 9 is a block diagram to describe a hardware configuration of the vein imaging apparatus 10 according to an embodiment of the present invention.

The vein imaging apparatus 10 mainly includes a CPU 901, ROM 903, RAM 905, a host bus 907, a bridge 909, an external bus 911, an interface 913, an input device 915, an output device 917, a storage device 919, a drive 921, a connection port 923, and a communication device 925.

The CPU 901 serves as a processing unit and a control unit, and it controls the whole or a part of operation in the vein imaging apparatus 10 according to programs stored in the ROM 903, the RAM 905, the storage device 919 or a removable recording medium 927. The ROM 903 stores a program to be used by the CPU 901, a processing parameter and so on. The RAM 905 primarily stores a program to be used in the execution on the CPU 901, a parameter that varies during the execution and so on. The CPU 901, the ROM 903 and the RAM 905 are connected with one another through the host bus 907, which is an internal bus such as a CPU bus.

The host bus 907 is connected to the external bus 911 such as a Peripheral Component Interconnect/Interface (PCI) bus via the bridge 909.

The input device 915 is an operating means to be operated by a user, such as a mouse, a keyboard, a touch panel, a button, a switch or a lever, for example. The input device 915 may be a remote controlling means (or a remote control) using an infrared ray or another radio wave, or an external connected equipment 929 compatible with the operation of the vein imaging apparatus 10, such as a cellular phone or a PDA. Further, the input device 915 is configured by an input control circuit that generates an input signal based on information input by a user using the above operating means and outputs it to the CPU 901, for example. A user of the vein imaging apparatus 10 manipulates the input device 915 to thereby input various kinds of data or direct a processing operation to the vein imaging apparatus 10.

The output device 917 is configured by a display device such as a CRT display device, a liquid crystal display device, a plasma display device, an EL display device or a lamp, an audio output device such as a speaker or a headphone, or a device for visually or auditorily presenting a user with acquired information such as a printer, a cellular phone or a facsimile, for example. The output device 917 outputs results obtained as a result of performing various kinds of processing by the vein imaging apparatus 10, for example. Specifically, the display device displays a result obtained by the processing of the vein imaging apparatus 10 by a text or an image. The audio output device converts an audio signal containing reproduced audio data, acoustic data or the like into an analog signal and outputs it.

The storage device 919 is a device for data storage that is configured as an example of a storage unit of the vein imaging apparatus 10. The storage device 919 may be configured by a magnetic storage device such as a hard disk drive (HDD), a semiconductor storage device, an optical storage device, a magneto-optical storage device or the like. The storage device 919 stores a program to be executed by the CPU 901, various kinds of data, or various kinds of data acquired from the outside, for example.

The drive 921 is a reader/writer for a recording medium, which is built in the vein imaging apparatus 10 or attached externally. The drive 921 reads information that is recorded in the removable recording medium 927 such as a magnetic disk, an optical disk, a magneto-optical disk or semiconductor memory which is attached thereto and outputs the information to the RAM 905. Further, the drive 921 can write information into the removable recording medium 927 such as a magnetic disk, an optical disk, a magneto-optical disk or semiconductor memory which is attached thereto. The removable recording medium 927 may be a DVD medium, an HD-DVD medium, a Blu-ray medium, a compact flash (CF) (registered trademark), a memory stick, a secure digital (SD) memory card or the like. Further, the removable recording medium 927 may be an integrated circuit (IC) card or an electronic device incorporating a contactless IC chip.

The connection port 923 is a port for directly connecting equipment to the vein imaging apparatus 10, such as a universal serial bus (USB) port, an IEEE 1394 port such as i.Link, a small computer system interface (SCSI) port, an RS-232C port, an optical audio terminal, or a high-definition multimedia interface (HDMI) port. By connecting the external connected equipment 929 to the connection port 923, the vein imaging apparatus 10 can directly acquire various kinds of data from the external connected equipment 929 or supply various kinds of data to the external connected equipment 929.

The communication device 925 is a communication interface that is configured by a communication device or the like for establishing a connection with a communication network 931, for example. The communication device 925 may be a communication card for wired or wireless local area network (LAN), Bluetooth or wireless USB (WUSB), a router for optical communication, a router for asymmetric digital subscriber line (ADSL) or a modem for various kinds of communications, for example. The communication device 925 can transmit and receive a signal or the like to and from the Internet or another communication device in conformity to a prescribed protocol such as TCP/IP, for example. Further, the communication network 931 that is connected to the communication device 925 is configured by a network or the like connected by wired or wireless means, and it may be the Internet, home LAN, infrared data communication, radio wave communication, satellite communication or the like.

One example of the hardware configuration capable of implementing the functions of the vein imaging apparatus 10 according to an embodiment of the present invention is described in the foregoing. Each of the above-described elements may be configured using a general-purpose member or circuit, or it may be configured by hardware specialized to the function of each element. It is thereby possible to change the hardware configuration to use as appropriate according to the technique level when implementing the embodiment.

SUMMARY

As described in the foregoing, the vein imaging apparatus 10 according to an embodiment of the present invention enables implementation of a flat sensor using a microlens array and also enables creation of a thumbnail image at a high speed. The high-speed creation processing of a thumbnail image is achieved by division drive control of the image pickup device with use of the characteristics of a microlens array. By applying the thumbnail image creation method to a vein authentication apparatus, it is possible to speed up pre-processing of authentication such as template search and positional registration.

Further, by switching between high-resolution imaging by high accuracy authentication and thumbnail images at a high frame rate according to need, it is possible to use the vein imaging apparatus according to an embodiment of the present invention also as an optical touchpad or the like.

The present application contains subject matter related to that disclosed in Japanese Priority Patent Application JP 2008-253970 filed in the Japan Patent Office on Sep. 30, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A vein imaging apparatus comprising:
    a lens array including a plurality of photo-receiving lenses;
    a plurality of near-infrared illumination sources placed along opposed ends of the lens array to illuminate a part of a living body including a vein with near-infrared light;
    an image pickup device to create a picked-up image of the vein based on the near-infrared light scattered inside the living body, transmitted through the vein and gathered by the lens array, the image pickup device including a plurality of photoreceptors allocated to each of the plurality of photo-receiving lenses; and
    a thumbnail image creation unit comprising a computing processor configured to:
        select, for each of the plurality of photo-receiving lenses included in the lens array, one photoreceptor among the plurality of photoreceptors, wherein a plurality of selected photoreceptors are in phase with one another,
        acquire information about the near-infrared light received by each of the selected photoreceptors as pixel information for each corresponding photo-receiving lens, and
        create a thumbnail image based on the acquired pixel information by combining the acquired pixel information.

2. The vein imaging apparatus according to claim 1, wherein the thumbnail image creation unit creates the thumbnail image by combining the acquired pixel information without performing reversal processing.

3. The vein imaging apparatus according to claim 1, further comprising:
    an image pickup device control unit to perform drive control of the image pickup device,
    wherein the image pickup device control unit performs drive control along a given direction of the image pickup device by dividing the photoreceptors in several units along the given direction of the image pickup device.

4. The vein imaging apparatus according to claim 3, wherein the image pickup device control unit outputs the pixel information of the plurality of photoreceptors along another direction orthogonal to the given direction as an average value.

5. The vein imaging apparatus according to claim 1, further comprising:
   a parallax information acquisition unit to acquire information about parallax when imaging a part of the living body based on a plurality of thumbnail images,
   wherein the thumbnail Image creation unit acquires a plurality of kinds of information about the near-infrared light received by the photoreceptors in phase with one another with respect to each photo-receiving lens when acquiring the pixel information for all the photo-receiving lenses and creates a plurality of kinds of thumbnail images.

6. A thumbnail image creation method comprising:
   illuminating a part of a living body including a vein with near-infrared light;
   gathering the near-infrared light scattered inside the living body and transmitted through the vein by a lens array including a plurality of photo-receiving lenses;
   imaging the near-infrared light scattered inside the living body, transmitted through the vein and gathered by the lens array with use of an image pickup device including a plurality of photoreceptors allocated to each of the plurality of photo-receiving lenses; and
   selecting, for each of the plurality of photo-receiving lenses included in the lens array, one photoreceptor among the plurality of photoreceptors, wherein a plurality of selected photoreceptors are in phase with one another,
   acquiring information about the near-infrared light received by each of the selected photoreceptors as pixel information for each corresponding photo-receiving lens, and
   creating a thumbnail image based on the acquired pixel information by combining the acquired pixel information.

* * * * *